United States Patent [19]

Worden

[11] 3,963,233

[45] June 15, 1976

[54] FABRICATING A GLASS LAMPSHADE CONSTRUCTION FORM

[76] Inventor: Howard L. Worden, P.O. 271, Granger, Wash. 98932

[22] Filed: Nov. 13, 1974

[21] Appl. No.: 523,510

Related U.S. Application Data

[62] Division of Ser. No. 387,929, Aug. 13, 1973, Pat. No. 3,872,574.

[52] U.S. Cl. ........................ 269/289 R; 269/321 W; 29/412

[51] Int. Cl.[2] ........................ B23P 17/00; B23Q 3/00

[58] Field of Search............ 269/289, 321 S, 321 W, 269/321 WW; 248/176; 29/283, 445, 412; 240/108 R; 46/15–17; 273/157 R, 157 A; 35/18 A, 46 A, 73

[56] References Cited

UNITED STATES PATENTS

| | | | |
|---|---|---|---|
| 639,941 | 12/1899 | Rossi-Diehl | 35/18 A X |
| 3,565,442 | 2/1971 | Klein | 273/157 R |
| 3,659,360 | 5/1972 | Zeischegg | 273/157 R X |
| 3,810,295 | 5/1974 | Kirth | 240/108 R X |
| 3,851,884 | 12/1974 | Myller | 35/46 A X |

*Primary Examiner*—Al Lawrence Smith
*Assistant Examiner*—James G. Smith
*Attorney, Agent, or Firm*—Seed, Berry, Vernon & Baynham

[57] ABSTRACT

A form for making a glass lampshade constructed by cutting a solid mold having an outer surface of a desired configuration into a pie-shaped section, shaping it so that it will stand on a table with the curved surface uppermost and placing a pattern upon the section of the form. The glass lampshade is constructed using the form by the method of placing colored glass or the like upon the form in conformance with the pattern and securing the glass sections together in a manner well known in the art. Following the completion of one section, an identical section is formed using the same form, and this process is repeated until a sufficient number of sections are fabricated to form an entire shade. The sections are then secured together to complete the shade.

6 Claims, 6 Drawing Figures

FABRICATING A GLASS LAMPSHADE CONSTRUCTION FORM

CROSS-REFERENCE TO RELATED APPLICATION

This is a division of application Ser. No. 387,929, filed Aug. 13, 1973, now U.S. Pat. No. 3,872,574, and entitled "Method of Fabricating a Glass Lampshade."

BACKGROUND OF THE INVENTION

1. Field of the Invention

This invention relates to lampshades and, more particularly, to a form for and a method of making Tiffany-type lampshades.

2. Description of the Prior Art

Tiffany-type lampshades made popular by the Tiffany Studios of New York around the turn of the century have again received an upsurge of popularity. Tiffany lampshades, as fabricated by professionals and presently marketed, are quite expensive. Many individuals have taken up the fabrication of Tiffany-type lampshades as a hobby, thereby producing their own lampshades at far less cost. Very close approximations to the original Tiffany-type shades can be made very successfully by a person of reasonable talent and skill. Companies now provide the home fabricator with molds and/or cut pieces of glass to fit a given pattern, making the entire process quite feasible. One of the drawbacks of the present method of fabricating Tiffany-type lampshades from kits in the home is that the molds are very expensive and bulky. The molds and method presently utilized must be located on a table so that the fabricator can work on all sides of the form as he progresses or, alternatively, be able to rotate the table so that all sides of the form are, at one time or another, in front of the hobbyist.

In addition to the prior art as noted above, other methods of making lampshades are disclosed in U.S. Pat. No. 793,613, granted to Crooke on Aug. 1, 1905, which discloses a method of fabricating an imitation leaded glass frame in sections; U.S. Pat. No. 901,690, granted to Crook in 1908, which discloses a slight modification to his 1905 patent; U.S. Pat. No. 924,456, granted to Handel on June 8, 1909, which discloses a lampshade of sections and the method of securing the sections together; U.S. Pat. No. 1,334,640, granted to Beals on Mar. 30, 1920, which discloses a sectional lampshade and a method of securing the sections together; U.S. Pat. No. 2,304,458, granted Dec. 8, 1942, to Hauskin, which discloses making a lampshade by the process of adhering translucent material to a layer of flexible material; and U.S. Pat. No. 3,675,008, granted July 4, 1972, to Hill, which discloses a method which utilizes a plastic shell upon which elongated members are stacked in interleaved relation to form the completed shade. These references, although dealing with a method of fabricating lampshades utilizing a sectional approach, do not provide the hobbyist with a method of fabricating a Tiffany-type shade in a simple, economical fashion.

SUMMARY OF THE INVENTION

With the above-known prior art and problems in mind, it is an object of the present invention to provide a method of forming a Tiffany-type lampshade which is inexpensive and well within the scope of a person of ordinary manipulative skill.

Another object of the present invention is to provide a mold upon which a Tiffany-type lampshade may be fabricated, a mold which may be placed upon a supporting surface in front of the fabricator and utilized to fabricate one complete section of the Tiffany-type shade at a time and then reused to form an identical section. The plurality of sections are then joined together to form a complete shade.

It is still another object of the present invention to provide a method for forming a Tiffany-type lampshade comprising the steps of fabricating a plurality of identical sections and then securing the sections together to form the conpleted shade. Each of the sections formed is identical and sequentially formed upon the same mold.

Yet another object is to provide a Tiffany-type lampshade fabricated by the method described hereinafter in detail.

DETAILED DESCRIPTION OF THE DRAWINGS

Figure 1:
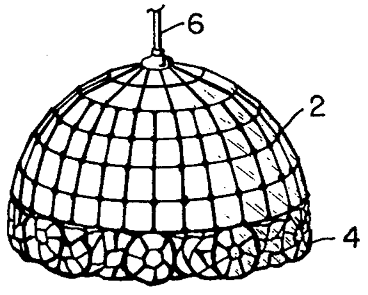
FIG. 1 is an illustrative view of a typical Tiffany-type shade which could be fabricated by the method described herein.

As can be seen in FIG. 1, a Tiffany-type lamp includes a curved shade 2 generally fabricated of a plurality of small pieces of glass which are secured together by use of copper foil, lead came or other methods to form the shape and design desired. Oftentimes the shade has a contrasting lower border 4 and obviously has the required electrical connection and suspension means 6.

Figure 2:
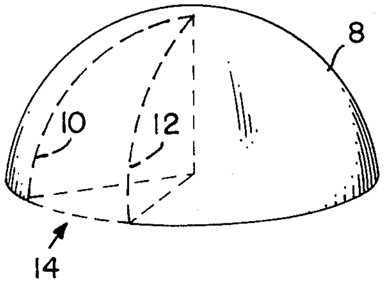
FIG. 2 is a mold upon which the Tiffany-type shade may be fabricated, depicting the section to be removed for utilization of the present method.

The method of fabricating the lamp in accordance with the present invention includes taking a mold 8 (see FIG. 2) which would conform to the general shape of the lampshade as desired. The mold is then cut into a pie-shaped piece along lines 10 and 12 and the pie-shaped piece removed. The remainder of the mold can be utilized for other pie-shaped pieces which can be handled in exactly the same manner as hereinafter described. The utilization of a pie-shaped piece, as described hereinafter, allows a single mold 8, which may be expensive, to be utilized by a plurality of hobbyists or lampmakers and each piece to be used more than once.

Figure 4:
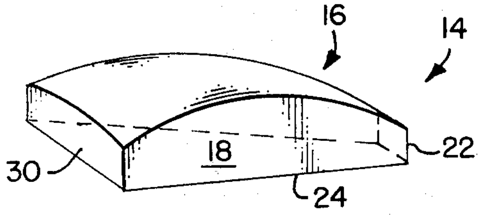
FIG. 4 is a depiction of the section of the mold in use and lying flat on the table.
Figure 3:
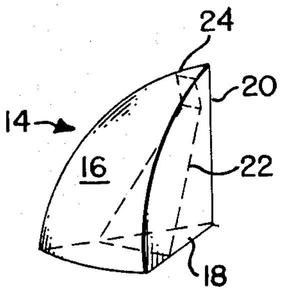
FIG. 3 is a showing of the section removed, with the lines indicating a portion of the section to be removed so the section will be stable while used.

Referring now to FIG. 3, the pie-shaped piece 14 has a curved outer surface 16 and a pair of side surfaces 18 which converge at a point 20. To place the mold in a condition to be utilized in the present invention, the tip of the pie-shaped piece is removed as along lines 22–24, thus leaving a configuration as seen in FIG. 4. This functional piece has generally flat sides 18, a foreshortened front end portion 22, a curved upper portion 16 and a flat bottom portion 24 upon which the mold 14 rests during the fabrication of the lampshade itself.

As seen in FIG. 4, the completed partial mold 14, which is utilized to fabricate a section of the completed lampshade, has placed thereon a pattern or design (not shown) such that the hobbyist or fabricator can follow the design when working upon his particular shade and place pieces of glass upon the mold 14 in accord with the pattern.

Figure 5:
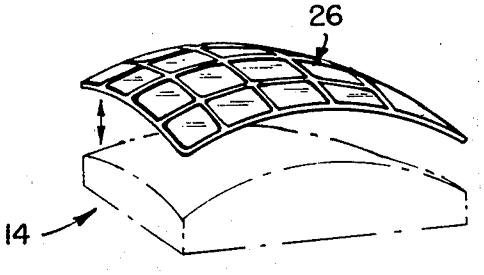
FIG. 5 is a depiction of a completed section of the lampshade being removed from the mold section.

Referring now to FIG. 5, the mold 14 is shown in phantom and, as can be seen, a plurality of glass pieces have been placed upon the top of the mold 14 in accordance with the pattern established in FIG. 4. The glass pieces are secured in position by means of copper foil, lead came or other satisfactory methods. The finished section 26, although fabricated of a plurality of small pieces, is a rigid section which conforms to the curvature of the mold 14 and will be set aside while the artisan fabricates a second, third, fourth and however many sections are necessary to complete the lampshade.

Figure 6:
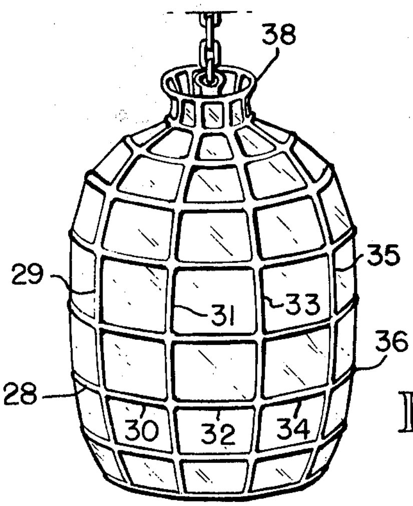
FIG. 6 is an illustration of a tulip-shaped lampshade fabricated by the present method.

After completing a sufficient number of identical sections, as described hereinabove, the fabricator then joins the sections to form a completed shade such as shown in FIG. 6. As seen in this figure, the sections designated by reference numerals 28, 30, 32 and 34 are joined by joining means along lines 29, 31, 33 and 35.

The means whereby the sections 28, 30, 32 and 34 are joined will be compatible with the means whereby the individual glass pieces have been connected together to form the section 26 such that when completed it will be virtually impossible to tell that the lampshade was not fabricated as one solid single unit.

It is to be noted in FIG. 6 that the lampshade has a complex curved structure and flares outwardly at the upper portion 38. The structure is noted to also be a tulip-shaped configuration wherein the bottom of the lampshade is turned inwardly. Configurations of this nature are simply and quickly made upon the mold and by the method hereinabove described. If the person were to attempt to fabricate the entire shade with these complex curvatures as a unit upon a single mold, he would either have to destroy the mold to remove the glass or not be able to fabricate the shade desired.

As can readily be seen, the hereinabove described method allows a home hobbyist or even a professional to make very distinctive, attractive, Tiffany-type lampshades without the requirement of special expensive equipment. Further, he is capable of fabricating a lamp with a complex curve without destroying his mold.

The embodiments of the invention in which a particular property or privelege is claimed are defined as follows:

1. A method of constructing a partial lampshade construction form, comprising:

producing an original form which reflects the desired shape of the shade, and producing from the original form at least one segment defining a partial form which is an integer portion of the original form whereby an integer number of segments identical to said partial form may be joined together to reproduce the shape of the original form.

2. The method of claim 1 wherein the partial form contains a planar surface for stably supporting said partial form on a planar, horizontal surface, with the outer surface of said form facing substantially away from said horizontal surface.

3. The method of claim 2, further including the step of affixing a pattern to the outer surface of said partial form.

4. A partial lampshade construction form constructed by the method of claim 1.

5. A partial lampshade construction form constructed by the method of claim 2.

6. A partial lampshade construction form constructed by the method of claim 3.

* * * * *